United States Patent [19]
Gonzales et al.

[11] Patent Number: 6,007,005
[45] Date of Patent: Dec. 28, 1999

[54] ABS RECYCLING PROCESS

[75] Inventors: James E. Gonzales; Mark T. Krejchi; Robson M. Mafoti; Kennneth W. Odstrcil; Finian E. Hoelscher; Eric W. Kendall; Yein Ming Lee; Frank B. Cloud, all of Temple; Anthony S. Oriseh, Belton, all of Tex.

[73] Assignee: Premark RWP Holdings, Inc., Wilmington, Del.

[21] Appl. No.: 09/270,778

[22] Filed: Mar. 17, 1999

[51] Int. Cl.⁶ ..................................... B02C 19/12

[52] U.S. Cl. ..................... 241/20; 241/24.13; 241/24.18; 241/27

[58] Field of Search ............................. 241/20, 22, 24.1, 241/24.12, 24.13, 24.18, 27, 101.4

[56] References Cited

U.S. PATENT DOCUMENTS

| | | | |
|---|---|---|---|
| 4,467,969 | 8/1984 | Godfrey et al. | 241/101.4 X |
| 5,225,137 | 7/1993 | Sadr | 264/349 |
| 5,328,104 | 7/1994 | Lima et al. | 241/24 |
| 5,482,216 | 1/1996 | Hess | 241/23 |
| 5,566,889 | 10/1996 | Preiss | 241/19 |
| 5,653,867 | 8/1997 | Jody et al. | 241/24.18 X |
| 5,667,151 | 9/1997 | Miura et al. | 241/20 |

*Primary Examiner*—John M. Husar
*Attorney, Agent, or Firm*—Aquilino, Welsh & Flaxman

[57] ABSTRACT

The present recycling process is accomplished by first shredding used plastics to produce shredded plastics, separating metals and undesirable plastics from the shredded plastics to produce separated plastics, analyzing the material composition of the separated plastics, and blending the separated plastics to produce a desirable recycled plastic.

8 Claims, 2 Drawing Sheets

ABS RECYCLING PROCESS

BACKGROUND OF THE INVENTION

1. Field of the Invention

The invention relates to a process for recycling commingled plastics. More particularly, the invention relates to a process for shredding, separating and blending commingled poly(acrylonitrile-c-butadiene-c-styrene) (ABS) and polycarbonate ABS (PCABS) to produce recycled ABS/PCABS useful in the manufacture of products.

2. Description of the Prior Art

ABS is extensively used in the manufacture of inexpensive, durable products. The durability of ABS has made it a primary material in the manufacture of products such as, computer housings, televisions and computer monitor housings, automobile components, etc.

Unfortunately, however, ABS is somewhat expensive when supplied in its purest form. As such, the cost of manufacturing some products with ABS is prohibitively expensive despite the fact that the material characteristics of the ABS are well suited for the manufacture of the products.

Plastic recycling has received substantial interest in recent years and many advances have been made in both recycling techniques and the devices manufactured from recycled plastics. Unfortunately, many of these processes are somewhat time consuming and are not appropriate for recycling certain goods. Existing recycling techniques require that the plastics be identified, i.e., "fingerprinted", and separated based upon their specific composition (for example, by coding as commonly found on many products sold today) before they may be fully recycled for subsequent use. Where the commingled plastics are not separated prior to subsequent recycling steps, the resulting recycled product is a useless collection of commingled recycled plastic.

Where the recycled goods are composed of a single plastic component (for example, plastic soda and milk containers), recycling is highly cost effective and leads to many useful products. However, the necessity of separating the assortment of plastic components prior to shredding and granulating makes recycling commingled plastic products highly time consuming and prohibitively expensive. Existing recycling techniques are, therefore, not appropriate where the recycled goods include many components composed of various plastics.

For example, where it is desired to recycle the plastic components of a computer housing (which is primarily composed of ABS, PCABS, and other plastics) to take advantage of the recycled ABS, the computer housing must first be separated into various components representing the many plastics used in the construction of the computer housing. This is highly time consuming, and makes recycling computer housings cost prohibitive. Such limitations are commonly found with ABS products one might consider appropriate for recycling.

The lack of an effective recycling process for those products already manufactured from ABS leaves previously used ABS products wasted once the useful life of the manufactured product is reached. Many materials have found a second life through recycling. However, a process for refining the used material must be developed before the material may find a second life in another product. Often, the second life of a product requires that the material be used in an environment where the aesthetic appearance of the material is not as important as when the material was used for its original purpose.

For example, it has been found that ABS is ideal for use as a substrate in the manufacture of decorative laminates. A substrate for a decorative laminate is generally not seen by the public and there is no requirement that the decorative laminate substrate be aesthetically pleasing. As such, although the cost of pure unprocessed ABS is prohibitively expensive when used in the manufacture of substrates, less expensive, recycled ABS is an ideal candidate for use in the manufacture of decorative laminate substrates.

Unfortunately, no process is currently known for effectively and efficiently recycling ABS for subsequent use. The present invention provides a process for recycling ABS in a manner permitting previously used ABS to obtain a second life. The present process employs shredding, separating and blending to recycle used ABS for subsequent use in other products, for example, substrates of decorative laminates.

SUMMARY OF THE INVENTION

It is, therefore, an object of the present invention to provide a process for recycling plastics. The process is accomplished by first shredding used plastics to produce shredded plastics, separating metals and undesirable plastics from the shredded plastics to produce separated plastics, analyzing the material composition of the separated plastics, and blending the separated plastics to produce a desirable recycled plastic.

It is also an object of the present invention to provide a process for recycling plastics wherein the step of separating metals and undesirable plastics includes the steps of treating the shredded material in a separation wash having a specific gravity which separates metals from plastics and treating the shredded material in a separation wash having a predetermined specific gravity which separates desirable plastics from undesirable plastics.

It is another object of the present invention to provide a process for recycling plastics wherein the specific gravity of the separation wash used to remove metal is approximately 1.23–1.25 $g/cm^3$.

It is a further object of the present invention to provide a process for recycling plastics wherein the specific gravity of the separation wash used to remove undesirable plastics is approximately 1.00 $g/cm^3$.

It is also an object of the present invention to provide a process for recycling plastics.

It is another object of the present invention to provide a process for recycling plastics wherein the used plastics are ABS and/or PCABS.

It is a further object of the present invention to provide a process for recycling plastics including the step of removing metals from the used plastics before shredding the used plastics.

It is also an object of the present invention to provide a process for recycling plastics including the step of collecting plastics from different suppliers, wherein the plastics from different suppliers are separately shredded, separated and analyzed to create groupings of separated plastics which are then blended to create a desired recycled plastic.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
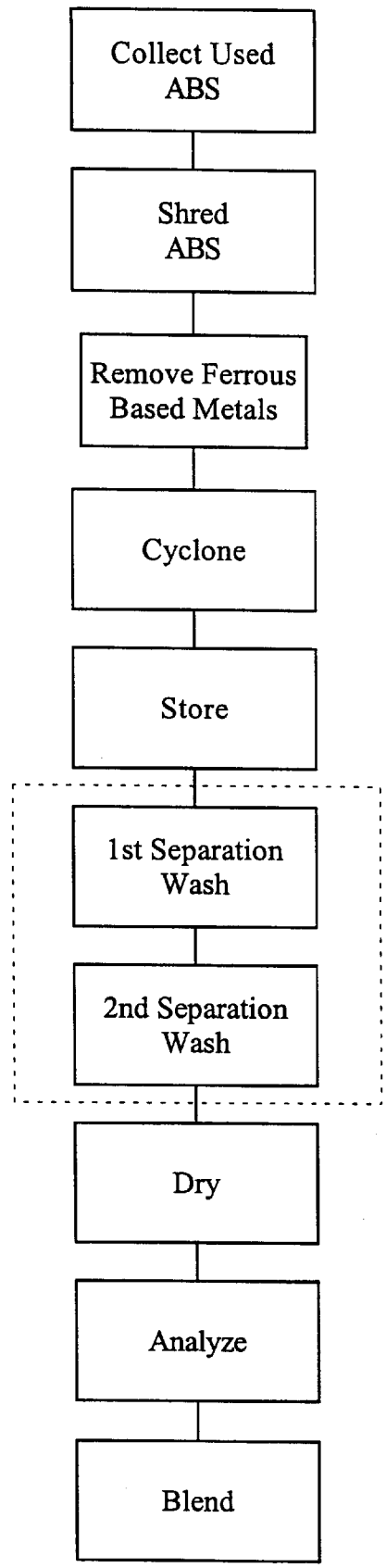
FIG. 1 is a flow chart of the recycling process employed in accordance with the present invention.

With reference to FIG. 1, a flow chart of the present recycling process is disclosed. The process employs shredding, separation and blending of commingled plastics to produce recycled ABS and PCABS useful in the manufacture of new products. The present recycling process employs a series of steps to remove undesirable components. The removed undesirable components include, but are not limited to, metals, resins, foams, thermosets, rubbers, and foils, which, if included in the recycled product would prevent subsequent use of the recycled product. Specifically, any of these undesirable components would contaminate the recycled product and prevent further processing of the recycled product, for example, by extrusion.

Those skilled in the art will readily appreciate the fact that the computer housings recycled in accordance with the preferred embodiment of the present invention include substantial amounts of both ABS and PCABS, as well as a variety of other commingled plastics (for example, polyphenyloxides and polystyrenes), and are the primary used source for recycled plastic in accordance with the preferred embodiment of the present. While it is commonly understood that housings such as those used in accordance with the present invention generally include substantial quantities of PCABS, for the sake of simplicity when the generic term ABS is used alone within the remainder of the specification, it should be understood to refer to plastics which may include ABS alone, commingle ABS/PCABS and other useful plastics, or PCABS alone.

Recycled ABS has found particular usefulness in the manufacture of substrates for decorative laminates. For example, commonly owned U.S. patent application Ser. No. 09/173,065, entitled "Laminate", filed Oct. 16, 1998, which is incorporated herein by reference, and Ser. No. 09/179,448, entitled "Foam Core Countertop Profile Extrusion System", filed Oct. 27, 1998, which is incorporated herein by reference disclose, the use of recycled ABS in the manufacture of decorative laminates. In addition, commonly owned U.S. patent application entitled "ABS Substrate Extrusion Process", filed Mar. 28, 1999, is incorporated herein by reference and discloses the use of recycled ABS in the manufacture of decorative laminates.

At the present time, new ABS may be purchased for approximately $0.65 per pound. While this price is acceptable for the manufacture of various products, it is prohibitively expensive for the manufacture of other products not requiring the characteristics provided by new, pure ABS. The present process may be employed to manufacture recycled ABS/PCABS (which may be used in the manufacture of the products discussed above) at a cost of approximately $0.20 per pound, placing it well within the range of many products that must be manufactured at a lower cost to make them competitive within their specific markets.

Figure 2:
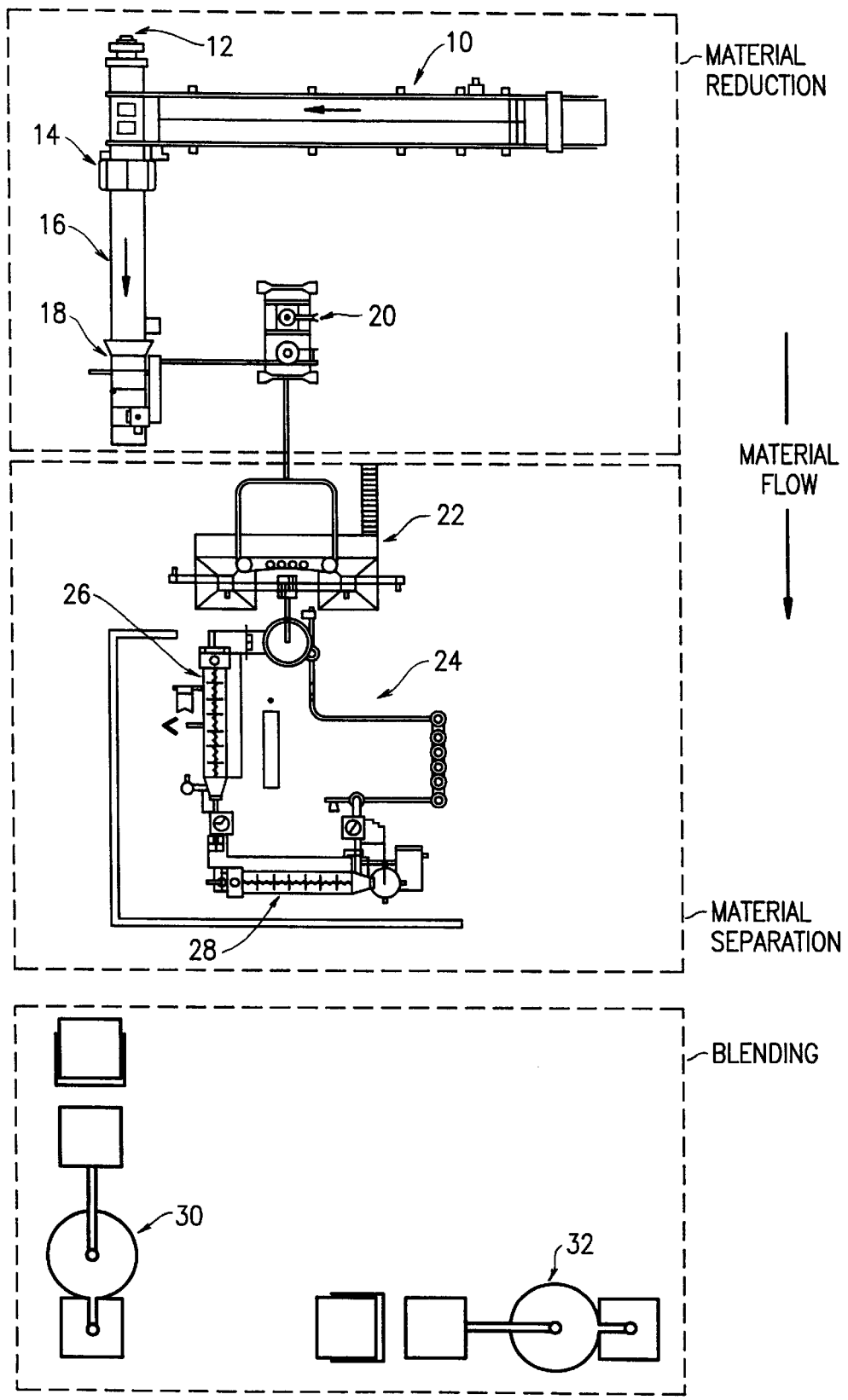
FIG. 2 is a schematic showing the present recycling process.

In accordance with the present invention, and with reference to FIGS. 1 and 2, discarded ABS is first collected from a variety of sources. For example, outdated computer housings and other electronic equipment housings are commonly discarded after their useful life has been reached. As such, used ABS is readily available from various ABS providers at a reasonable cost. While electronic housings are used in accordance with the preferred embodiment of the present invention, it should be understood that other ABS sources may be employed without departing from the spirit of the present invention. As discussed above, it should be understood that the collected products are not generally composed of simple ABS. These products are generally composed of ABS and PCABS, as well as smaller quantities of plastics such as polyphenoloxide, polystyrene, etc.

Once the used ABS is collected, the ABS products from a single ABS provider are set on a conveyor 10 and moved to a shredder 12. The shredded product is then passes to a fixed magnet 14, for example, a belt magnet, where ferrous based metals are removed from the shredded product. Preferably, the products are shredded using a Saturn Shredder, although other shredders, for example, Hammermill, may be used without departing from the spirit of the present invention.

The shredded ABS is then carried by a granulator infeed conveyor 16 to a granulator 18, where the shredded ABS is granulated to a size of approximately ⅜". The granulated ABS is then placed within a cyclone 20 to remove various contaminants from the ABS. For example, paper, debris and fines are removed by treating the granulated ABS within the cyclone 20. The treated ABS is then stored in storage silos 22 where it awaits further treatment.

Although metals are previously removed from the ABS products in accordance with the ferrous-based metal removal step, metals and undesirable plastics are often found integrally formed with the ABS products. The granulated ABS is, therefore, treated with a dual separation wash 24 designed to remove any remaining metals and undesirable plastics maintained in the ABS being processed. The dual separation wash 24 is a continuous process.

Specifically, the granulated ABS is washed in a first separation wash tank 26 filled with a fluid having a specific gravity of approximately 1.23 $g/cm^3$ to approximately 1.25 $g/cm^3$. The preferred fluid is $H_2O$ and $CaCl_2$ mixed to create a desired specific gravity. At a specific gravity of approximately 1.23 $g/cm^3$–1.25 $g/cm^3$, the metals and heavier plastics mixed with the ABS will sink to the bottom of the first separation wash tank 26 where they are withdrawn and discarded. In this way, the granulated material is substantially freed from undesirable metals and plastics.

The useful granulated ABS is continuously taken from the top of the first separation wash tank 26 and passed to a second separation wash tank 28. The second separation wash tank 28 is used to separate the desirable plastics from the undesirable plastics. The desirable and undesirable plastics may be readily separated by taking advantage of the different densities of the plastics to achieve an effective separation. As such, the second separation wash tank 28 is provided with a fluid having a specific gravity of approximately 1.00 $g/cm^3$. At a specific gravity of 1.00 $g/cm^3$ the desirable ABS sinks to the bottom of the tank and undesirable plastics float at the top of the tank. The desirable ABS which sinks to the bottom of the tank is withdrawn from the bottom of the tank, while the undesirable plastics are skimmed from the top of the tank and discarded.

The dual wash separation technique discussed above may be varied, for example, the specific gravities employed could be altered, to process other materials, without departing from the spirit of the present invention.

At this point, the collected ABS is placed in a gaylord and permitted to dry. The collection of recycled ABS from a single ABS provider is then completed. Used ABS from other providers is then processed in the manner discussed above. However, the material composition of ABS used by different ABS providers varies from provider to provider. Since the recycled ABS ultimately collected from each ABS provider may not be exactly what is desired for a specific application, the processed ABS collected from each ABS provider is gathered, homogenized within a homogenizing blender 30 and analyzed to determine its specific material composition (that is, its mechanical and physical characteristics).

Once recycled ABS from various ABS providers is collected, homogenized and analyzed, the recycled ABS is blended within a formulation blender 32 and analyzed to produce an ABS composition desired for the specific application to which the recycled ABS is destined. For example, the tensile strength, impact resistance, ash content, polycarbonate content, etc. of the recycled ABS is considered in preparing the ideal composition for various applications.

In accordance with the preferred embodiment of the present invention, blending is achieved using standard equipment available in the marketplace, and various blending techniques and apparatuses may be used without departing from the spirit of the present invention. The compositional analysis is achieved using conventional techniques well known throughout the industry.

The resulting recycled ABS is substantially shredded pellet shaped and is sized for conventional use in the production of ABS products.

It should be understood that while the present process has been disclosed above for use in recycling ABS, it is contemplated that the disclosed process may be adapted for using in recycling a variety of commingle plastics.

While the preferred embodiment has been shown and described, it will be understood that there is no intent to limit the invention by such disclosure, but rather, is intended to cover all modifications and alternate constructions falling within the spirit and scope of the invention as defined in the appended claims.

We claim:

1. A process for recycling plastics, comprising the following steps:

shredding used plastics including ABS to produce shredded plastics;

separating metals and undesirable plastics from the shredded plastics to produce separated ABS by continuously treating the shredded plastics in a separation wash having a specific gravity which separates metals from plastics and treating the shredded plastics in a separation wash having a predetermined specific gravity which separates ABS from undesirable plastics;

analyzing the material composition of the separated ABS; and blending the separated ABS to produce a desirable recycled plastic.

2. The process according to claim 1, wherein the specific gravity of the separation wash used to remove metal is approximately 1.23–1.25 g/cm$^3$.

3. The process according to claim 1, wherein the specific gravity of the separation wash used to remove undesirable plastics is approximately 1.00 g/cm$^3$.

4. The process according to claim 1, wherein the step of separating metals and undesirable plastics includes the steps of treating the shredded material in a separation wash having a specific gravity which separates metals from plastics and subsequently treating the shredded material in a separation wash having a predetermined specific gravity which separates ABS from undesirable plastics.

5. The process according to claim 1, wherein the used plastics further includes PCABS and the step of separating metals and undesirable plastics produces separated commingling ABS and PCABS.

6. The process according to claim 1, further including the step of removing metals from the used plastics before shredding the used plastics.

7. The process according to claim 1, further including the step of collecting plastics from different suppliers, wherein the plastics from different suppliers are separately shredded, separated and analyzed to create groupings of separated plastics which are then blended to create a desired recycled plastic.

8. The process according to claim 7, wherein the plastics further includes PCABS and the step of separating metals and undesirable plastics produces separated commingled ABS and PCABS.

* * * * *